(12) United States Patent
Kobayashi et al.

(10) Patent No.: US 10,746,257 B2
(45) Date of Patent: Aug. 18, 2020

(54) TRANSMISSION BELT

(71) Applicant: BANDO CHEMICAL INDUSTRIES, LTD., Kobe-shi, Hyogo (JP)

(72) Inventors: Shogo Kobayashi, Kobe (JP); Taiki Tsuchiya, Kobe (JP); Teppei Nakayama, Kobe (JP); Shigeki Okuno, Kobe (JP); Hiroyuki Tachibana, Kobe (JP)

(73) Assignee: Bando Chemical Industries, Ltd., Kobe-shi, Hyogo (JP)

( * ) Notice: Subject to any disclaimer, the term of this patent is extended or adjusted under 35 U.S.C. 154(b) by 181 days.

(21) Appl. No.: 15/791,914

(22) Filed: Oct. 24, 2017

(65) Prior Publication Data

US 2018/0045273 A1 Feb. 15, 2018

Related U.S. Application Data

(63) Continuation of application No. PCT/JP2016/001946, filed on Apr. 7, 2016.

(30) Foreign Application Priority Data

Apr. 24, 2015 (JP) ................................. 2015-089543

(51) Int. Cl.
*F16G 5/08* (2006.01)
*C08J 5/06* (2006.01)
(Continued)

(52) U.S. Cl.
CPC .................. *F16G 5/08* (2013.01); *B32B 3/30* (2013.01); *B32B 5/022* (2013.01); *B32B 5/024* (2013.01); *B32B 5/026* (2013.01); *B32B 7/12* (2013.01); *B32B 25/02* (2013.01); *B32B 25/042* (2013.01); *B32B 25/10* (2013.01); *B32B 25/14* (2013.01); *B32B 25/16* (2013.01); *C08J 5/06* (2013.01); *C08L 1/02* (2013.01); *C09J 101/00* (2013.01); *C09J 121/00* (2013.01); *F16G 1/10* (2013.01);
(Continued)

(58) Field of Classification Search
CPC ..... F16G 5/20; F16G 5/08; F16G 1/08; F16G 1/10; C08L 23/16
USPC ................................................. 474/263, 260
See application file for complete search history.

(56) References Cited

U.S. PATENT DOCUMENTS 2,491,188 A * 12/1949 Lesesne ............... F16G 1/08
474/269
4,299,587 A * 11/1981 Imamura ............... F16G 5/08
474/262
(Continued)

FOREIGN PATENT DOCUMENTS

JP 2011-064257 A 3/2011
JP 2014-125607 A 7/2014
(Continued)

*Primary Examiner* — Henry Y Liu
(74) *Attorney, Agent, or Firm* — Knobbe, Marten, Olson & Bear, LLP (57) ABSTRACT

Disclosed is a power transmission belt having a belt body made of rubber, and a cord embedded in the belt body so as to form a helical pattern having a pitch in a belt width direction. The cord is coated with an adhesion layer formed by an adhesion treatment and containing a rubber component, and the adhesion layer is in contact with a rubber composition containing cellulose-based fine fibers.

14 Claims, 6 Drawing Sheets

(51) Int. Cl.

| | |
|---|---|
| *F16G 5/20* | (2006.01) |
| *C09J 101/00* | (2006.01) |
| *C08L 1/02* | (2006.01) |
| *B32B 25/02* | (2006.01) |
| *C09J 121/00* | (2006.01) |
| *B32B 25/16* | (2006.01) |
| *B32B 25/14* | (2006.01) |
| *B32B 5/02* | (2006.01) |
| *B32B 25/04* | (2006.01) |
| *B32B 3/30* | (2006.01) |
| *B32B 25/10* | (2006.01) |
| *B32B 7/12* | (2006.01) |
| *F16G 1/28* | (2006.01) |
| *F16G 1/10* | (2006.01) |
| *C08L 97/02* | (2006.01) |
| *C08L 23/16* | (2006.01) |

(52) U.S. Cl.
CPC ................ *F16G 1/28* (2013.01); *F16G 5/20* (2013.01); *B32B 2260/021* (2013.01); *B32B 2260/048* (2013.01); *B32B 2262/02* (2013.01); *B32B 2262/0223* (2013.01); *B32B 2262/0261* (2013.01); *B32B 2262/0269* (2013.01); *B32B 2262/0284* (2013.01); *B32B 2262/062* (2013.01); *B32B 2262/101* (2013.01); *B32B 2262/106* (2013.01); *B32B 2270/00* (2013.01); *B32B 2307/748* (2013.01); *B32B 2433/00* (2013.01); *C08J 2323/16* (2013.01); *C08J 2401/02* (2013.01); *C08J 2467/00* (2013.01); *C08J 2475/04* (2013.01); *C08J 2477/06* (2013.01); *C08L 23/16* (2013.01); *C08L 97/02* (2013.01); *C08L 2205/16* (2013.01)

(56) References Cited

U.S. PATENT DOCUMENTS

| | | | | |
|---|---|---|---|---|
| 4,432,744 | A * | 2/1984 | Imamura | D03D 1/0094 474/238 |
| 5,230,667 | A * | 7/1993 | Nakajima | D02G 3/28 474/263 |
| 2009/0032177 | A1* | 2/2009 | Takahashi | B29D 29/10 156/137 |
| 2009/0048048 | A1* | 2/2009 | Nakamura | B29D 29/103 474/263 |
| 2009/0264236 | A1* | 10/2009 | Omori | F16G 5/20 474/238 |
| 2012/0295748 | A1* | 11/2012 | Shiriike | F16G 5/06 474/148 |
| 2013/0217528 | A1* | 8/2013 | Matsumoto | F16G 1/10 474/263 |
| 2013/0237354 | A1* | 9/2013 | Shiriike | F16G 5/06 474/148 |
| 2014/0287862 | A1* | 9/2014 | Yamada | F16G 1/10 474/204 |
| 2014/0296010 | A1* | 10/2014 | Yoshida | B29D 29/103 474/190 |
| 2014/0323256 | A1* | 10/2014 | Yoshida | B29D 29/10 474/148 |
| 2015/0219185 | A1* | 8/2015 | Matsuda | F16G 1/10 474/238 |
| 2016/0208888 | A1* | 7/2016 | Nonaka | F16G 1/08 |

FOREIGN PATENT DOCUMENTS

| | | |
|---|---|---|
| JP | 2015-31315 A | 2/2015 |
| JP | 2015-48375 A | 3/2015 |
| WO | 2015/045256 A1 | 4/2015 |

* cited by examiner

TRANSMISSION BELT

CROSS-REFERENCE TO RELATED APPLICATION

This is a continuation of International Application No. PCT/JP2016/001946 filed on Apr. 7, 2016, which claims priority to Japanese Patent Application No. 2015-089543 filed on Apr. 24, 2015. The entire disclosures of these applications are incorporated by reference herein.

BACKGROUND

The present invention relates to a power transmission belt.

It is well known to use a rubber composition containing so-called cellulose nanofibers as a material for a power transmission belt. For example, Japanese Unexamined Patent Publication No. 2014-125607 discloses using, as a material for a power transmission belt, a rubber composition containing hydrophobically-modified cellulose-based fine fibers having a carboxy group with an average fiber diameter of 0.1 to 200 nm.

Japanese Unexamined Patent Publication No. 2015-31315 discloses using a rubber composition containing cellulose nanofibers as a material for a rubber layer on an inner peripheral surface of a flat belt.

SUMMARY

The present invention is directed to a power transmission belt having a belt body made of rubber, and a cord embedded in the belt body so as to form a helical pattern having a pitch in a belt width direction, wherein the cord is coated with an adhesion layer containing a rubber component formed by an adhesion treatment, and the adhesion layer is in contact with a rubber composition containing cellulose-based fine fibers.

DETAILED DESCRIPTION

Embodiments will be described in detail below.

First Embodiment (V-Ribbed Belt B)

Figure 1:
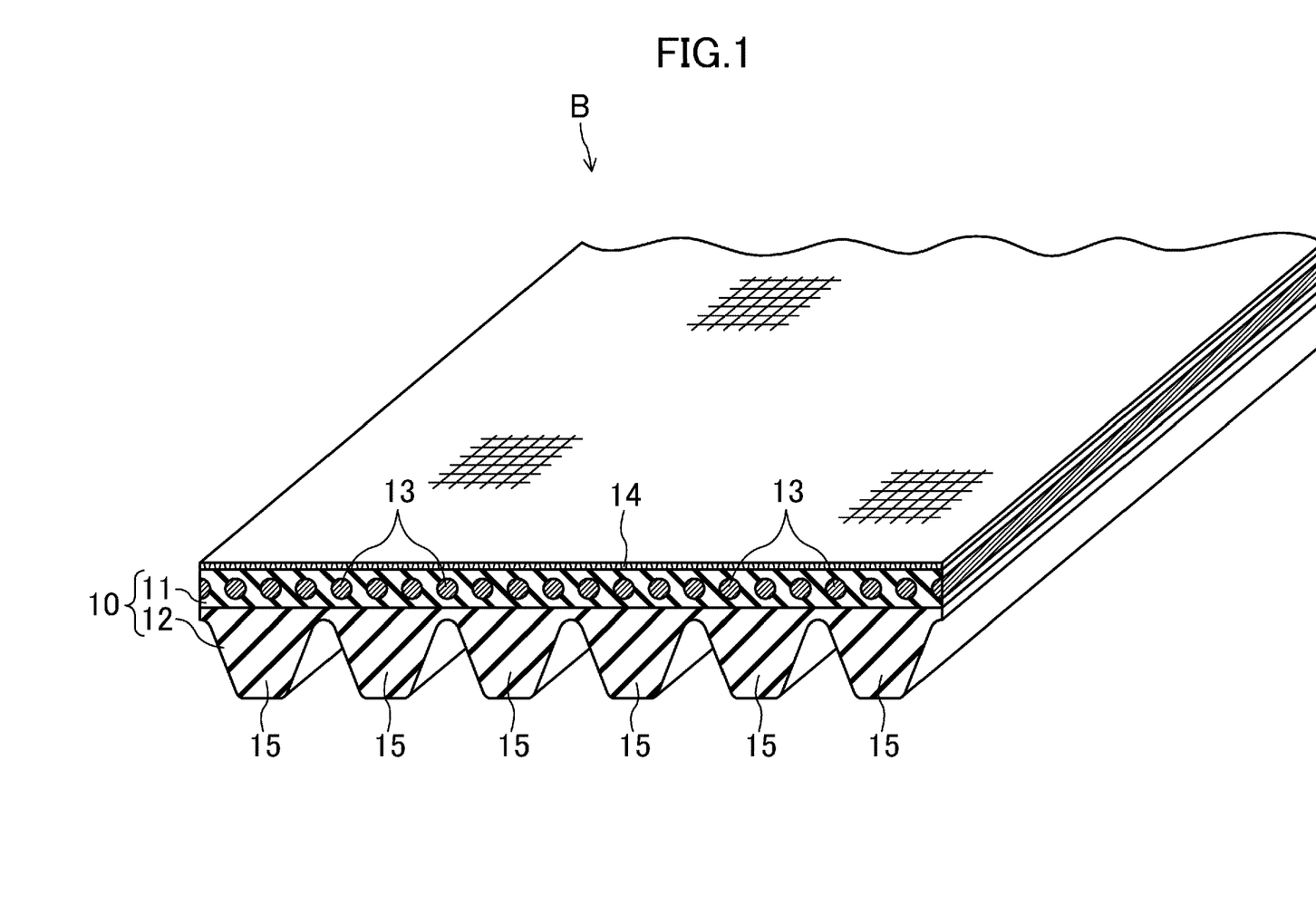
FIG. 1 illustrates a perspective view of a V-ribbed belt according to a first embodiment.

FIG. 1 illustrates a V-ribbed belt B (a power transmission belt) according to a first embodiment. The V-ribbed belt B of the first embodiment is, for example, an endless power transmission member used in an accessory belt transmission system provided in an engine compartment of an automobile. The V-ribbed belt B of the first embodiment has a length of 700 to 3000 mm, a width of 10 to 36 mm, and a thickness of 4.0 to 5.0 mm, for example.

The V-ribbed belt B of the first embodiment has a two-layered V-ribbed belt body 10 made of rubber which includes an adhesive rubber layer 11 constituting an outer surface of the belt and a compressed rubber layer 12 constituting a pulley contact portion of an inner surface of the belt. A cord 13 is embedded in a middle portion, in the belt thickness direction, of the adhesive rubber layer 11 of the V-ribbed belt body 10, such that the cord 13 forms a helical pattern having a pitch in the belt width direction. A backside reinforcing fabric 14 is attached to the belt outer surface of the adhesive rubber layer 11 of the V-ribbed belt body 10. The backside reinforcing fabric 14 may be replaced with a backside rubber layer.

The adhesive rubber layer 11 is in the shape of a strip having a horizontally elongated rectangular cross-section, and has a thickness of 1.0 to 2.5 mm, for example. The compressed rubber layer 12 includes a plurality of V-shaped ribs 15 protruding from the inner surface of the belt. The plurality of V-shaped ribs 15 are each in the shape of a rib extending in the longitudinal direction of the belt and having an approximately inverted triangular cross-section. The V-shaped ribs 15 are arranged parallel to one another in the width direction of the belt. Each of the V-shaped ribs 15 has, for example, a height of 2.0 to 3.0 mm, and a width of 1.0 to 3.6 mm at a proximal end. The number of the V-shaped ribs is 3 to 6 (6 ribs in FIG. 1), for example.

The adhesive rubber layer 11 and the compressed rubber layer 12 are made of a rubber composition produced by heating and pressing an uncrosslinked rubber composition prepared by kneading a rubber component into which various compound ingredients are blended, and then crosslinking the kneaded product with a crosslinker. The rubber compositions that make the adhesive rubber layer 11 and the compressed rubber layer 12 may be different from each other or the same as each other.

Examples of the rubber components of the rubber compositions that make the adhesive rubber layer 11 and the compressed rubber layer 12 include: an ethylene-α-olefin elastomer such as ethylene propylene copolymer (EPR), ethylene-propylene-diene terpolymer (EPDM), ethylene-octene copolymer, and ethylene-butene copolymer; chloroprene rubber (CR); chlorosulfonated polyethylene rubber (CSM); and hydrogenated acrylonitrile-butadiene rubber (H-NBR), for example. Suitably, the rubber components of the rubber compositions that make the adhesive rubber layer 11 and the compressed rubber layer 12 are made of one kind of these materials or blended rubber in which two or more kinds of these materials are blended. Suitably, the rubber components of the rubber compositions that make the adhesive rubber layer 11 and the compressed rubber layer 12 are the same as each other.

Examples of the compound ingredients include a reinforcing material, a filler, an antioxidant, a softener, a crosslinker, and a vulcanization accelerator. Short fibers may be mixed in the rubber composition that makes the compressed rubber layer 12. In that case, it is recommended that the short fibers included in the compressed rubber layer 12 be oriented in the belt width direction, and that the short fibers be arranged to protrude from the surface of the compressed rubber layer 12. Instead of being mixed in the rubber composition making the compressed rubber layer 12, the short fibers may be attached to the surface of the compressed rubber layer 12 by flocking, for example.

The cord 13 is made of twist yarn of fibers, such as polyamide fibers, polyester fibers, and aramid fibers. The diameter of the cord 13 is, for example, 0.5 to 2.5 mm. The distance between the centers of the cord 13 which are adjacent to each other in a cross-section is 0.05 to 0.20 mm, for example.

Examples of the fiber material which makes the cord 13 include polyester fibers (PET), aromatic polyamide fibers (aramid fibers), nylon fibers, glass fibers, carbon fibers, polyketone fibers, polyethylene naphthalate fibers (PEN), vinylon fibers, PBO fibers, and cotton, for example.

Figure 2:
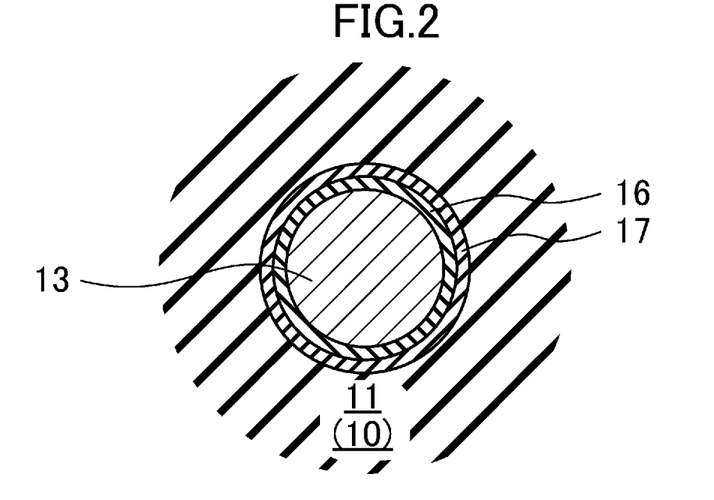
FIG. 2 illustrates a cross-sectional view of an interface structure between a cord and an adhesive rubber layer according to the first embodiment.

The cord 13 undergoes an adhesion treatment prior to the fabrication of the belt to provide adhesiveness to the V-ribbed belt body 10. Specifically, as will be described later, the cord 13 sequentially undergoes an RFL adhesion treatment in which the cord 13 is soaked in a resorcinol/formalin/latex aqueous solution (hereinafter referred to as an "RFL aqueous solution") and heated, and a rubber cement adhesion treatment in which the cord 13 is soaked in rubber cement and dried. Thus, as illustrated in FIG. 2, the cord 13 is coated with an RFL adhesion layer 16 formed in the RFL adhesion treatment, and is also coated with a rubber cement adhesion layer 17 formed in the rubber cement adhesion treatment. The rubber cement adhesion layer 17 is in contact with the adhesive rubber layer 11 of the V-ribbed belt body 10. Note that the cord 13 may undergo a primary coat adhesion treatment prior to the RFL adhesion treatment, so that a primary coat is formed under the RFL adhesion layer 16. In the primary coat adhesion treatment, the cord 13 is soaked in a primary coat adhesion treatment fluid made of a solution obtained by dissolving a primary coat adhesion treatment agent, such as epoxy resin and isocyanate resin (blocked isocyanate), in a solvent such as toluene, or a dispersion obtained by dispersing said agent in water.

The RFL adhesion layer 16 is made of solid content of the RFL aqueous solution, and contains resorcinol/formalin resin and a rubber component derived from rubber latex. The rubber cement adhesion layer 17 is made of a rubber composition of solid content of the rubber cement. The rubber composition which makes the rubber cement adhesion layer 17 contains cellulose-based fine fibers. Thus, the cord 13 is coated with the RFL adhesion layer 16 containing the rubber component, and the RFL adhesion layer 16 is in contact with the rubber cement adhesion layer 17 made of the rubber composition containing the cellulose-based fine fibers. The contact of the RFL adhesion layer 16 containing the rubber component with the rubber cement adhesion layer 17 made of the rubber composition containing the cellulose-based fine fibers allows the cord 13 to be highly adhesive to the adhesive rubber layer 11 of the V-ribbed belt body 10. The "fine fibers" used herein refer to fibers with a fiber diameter of 1.0 μm or less.

The rubber composition making the rubber cement adhesion layer 17 is obtained by heating and pressing an uncrosslinked rubber composition prepared by kneading a rubber component into which various compound ingredients are blended in addition to the cellulose-based fine fibers, and then crosslinking the kneaded product with a crosslinker.

Examples of the rubber component of the rubber composition that makes the rubber cement adhesion layer 17 include: an ethylene-α-olefin elastomer such as ethylene propylene copolymer (EPR), ethylene-propylene-diene terpolymer (EPDM), ethylene-octene copolymer, and ethylene-butene copolymer; chloroprene rubber (CR); chlorosulfonated polyethylene rubber (CSM); and hydrogenated acrylonitrile-butadiene rubber (H-NBR), for example. Suitably, the rubber component of the rubber composition that makes the rubber cement adhesion layer 17 is made of one kind of these materials or blended rubber in which two or more kinds of these materials are blended. Suitably, the rubber component of the rubber composition that makes the rubber cement adhesion layer 17 is the same as the rubber component of the rubber composition that makes the adhesive rubber layer 11 which comes in contact with the rubber cement adhesion layer 17.

The cellulose-based fine fibers are fine fiber materials derived from cellulose fine fibers made of a cytoskeleton component of a plant cell wall. The fine fiber materials are obtained by disentangling plant fibers. Example raw plants for the cellulose-based fine fibers include wood, bamboo, rice plants (rice straw), potato, sugarcane (bagasse), water plants, seaweed, etc., among which wood is suitable.

The cellulose-based fine fibers may be a cellulose fine fiber itself, or may be a hydrophobically-treated cellulose fine fiber. The cellulose fine fiber itself and the hydrophobically-treated cellulose fine fiber may be combined to form the cellulose-based fine fibers. For improved dispersibility, it is recommended that the cellulose-based fine fibers include hydrophobically-treated cellulose fine fibers. Examples of the hydrophobically-treated cellulose fine fibers include a cellulose fine fiber in which part or all of the hydroxyl groups of cellulose are substituted by hydrophobic groups, and a cellulose fine fiber the surface of which is hydrophobically treated with a surface treatment agent.

The hydrophobization of the cellulose fine fiber in which part or all of the hydroxyl groups of the cellulose are substituted by hydrophobic groups may be achieved by esterification (acylation), e.g., reactions resulting in the formation of alkyl ester, complex ester, β-keto ester, etc., alkylation, tosylation, epoxidation, and arylation, for example. Among these reactions, esterification is suitable. Specifically, the hydrophobized cellulose fine fiber obtained by esterification is a cellulose fine fiber in which part or all of the hydroxyl groups of the cellulose is acylated with carboxylic acid, such as acetic acid, acetic anhydride, propionic acid, and butyric acid, or with a halide of said acids (in particular, a chloride). Examples of the surface treatment agent used to obtain the cellulose fine fiber the surface of which is hydrophobically treated with the surface treatment agent include a silane coupling agent.

It is recommended that the fiber diameters of the cellulose-based fine fibers distribute in a wide range so that the cord 13 is highly adhesive to the adhesive rubber layer 11 of the V-ribbed belt body 10. From this point of view, the minimum fiber diameter in the distribution is suitably 50 nm or less, more suitably 20 nm or less, and still more suitably 10 nm or less. The maximum fiber diameter in the distribution is suitably 500 nm or more, more suitably 700 nm or more, and still more suitably 1 μm or more, from the same point of view. The range of distribution of the fiber diameters of the cellulose-based fine fibers suitably includes 50 to 500 nm, more suitably includes 20 nm to 700 mm, and still more suitably includes 10 nm to 1 μm so that the cord 13 is highly adhesive to the adhesive rubber layer 11 of the V-ribbed belt body 10.

The average fiber diameter of the cellulose-based fine fibers contained in the rubber composition making the rubber cement adhesion layer 17 is suitably 10 nm or more and more suitably 20 nm or more, and suitably 700 nm or less and more suitably 100 nm or less so that the cord 13 is highly adhesive to the adhesive rubber layer 11 of the V-ribbed belt body 10.

To obtain the distribution of the fiber diameters of the cellulose-based fine fibers, a sample of the rubber composition making the rubber cement adhesion layer 17 is frozen and powdered and the cross-sections thereof are observed with a transmission electron microscope (TEM), and 50 cellulose-based fine fibers are selected arbitrarily to measure the fiber diameters. The distribution of the fiber diameters of the cellulose-based fine fibers is obtained based on a result of the measurement. A number-average fiber diameter of the arbitrarily-selected 50 cellulose-based fine fibers is determined as the average fiber diameter of the cellulose-based fine fibers.

The cellulose-based fine fibers may be formed by a mechanically-defibrating means and have a high aspect ratio, or may be formed by a chemically-defibrating means and have a needle-like crystal shape. Suitably, the cellulose-based fine fibers are formed by a mechanically-defibrating means in order to achieve a wide range of distribution of the fiber diameters. Those formed by the mechanically-defibrating means and those formed by the chemically-defibrating means may be combined for use as the cellulose-based fine fibers. Example defibrating apparatuses used as the mechanically-defibrating means include a kneader, such as a biaxial kneader, a high-pressure homogenizer, a grinder, and a bead mill, for example. Example treatments used as the chemically-defibrating means include an acid hydrolysis treatment.

In the rubber composition making the rubber cement adhesion layer 17, the cellulose-based fine fibers are not oriented in a specific direction.

The content of the cellulose-based fine fibers in the rubber composition making the rubber cement adhesion layer 17 is suitably 1 part by mass or more, more suitably 3 parts by mass or more, and still more suitably 5 parts by mass or more, and suitably 30 parts by mass or less, more suitably 20 parts by mass or less, and still more suitably 10 parts by mass or less, with respect to 100 parts by mass of the rubber component of the rubber composition so that the cord 13 is highly adhesive to the adhesive rubber layer 11 of the V-ribbed belt body 10.

Examples of the compound ingredients include a reinforcing material, oil, a processing aid, a vulcanization accelerator aid, a crosslinker, and a vulcanization accelerator, for example.

Examples of carbon blacks used as the reinforcing material include: channel black; furnace black such as SAF, ISAF, N-339, HAF, N-351, MAF, FEF, SRF, GPF, ECF, and N-234; thermal black such as FT and MT; and acetylene black. Silica may also be used as the reinforcing material. Suitably, the reinforcing material is comprised of one kind or two or more kinds of these substances. Suitably, the content of the reinforcing material is 50 to 90 parts by mass with respect to 100 parts by mass of the rubber component of the rubber composition.

Examples of the oil include a petroleum softener, mineral oil-based oil such as paraffin wax, and vegetable oil-based oil such as castor oil, cottonseed oil, linseed oil, rapeseed oil, soybean oil, palm oil, coconut oil, peanut oil, Japan wax, rosin, and pine oil, for example. Suitably, the oil is comprised of one kind or two or more kinds of these oils. The content of the oil is 20 to 40 parts by mass with respect to 100 parts by mass of the rubber component of the rubber composition.

Examples of the processing aid include a stearic acid, polyethylene wax, and a metal salt of fatty acid. Suitably, the processing aid is comprised of one kind or two or more kinds of these substances. The content of the processing aid is 0.5 to 2 parts by mass with respect to 100 parts by mass of the rubber component of the rubber composition.

Examples of the vulcanization accelerator aid include a metal oxide such as magnesium oxide and zinc oxide (zinc white), a metal carbonate, a fatty acid and a derivative thereof, for example. Suitably, the vulcanization accelerator aid is comprised of one kind or two or more kinds of these substances. The content of the vulcanization accelerator aid is 3 to 7 parts by mass with respect to 100 parts by mass of the rubber component of the rubber composition.

Examples of the crosslinker include sulfur and an organic peroxide. Sulfur or an organic peroxide or both of them may be blended as the crosslinker. The content of sulfur as the crosslinker is 1 to 5 parts by mass with respect to 100 parts by mass of the rubber component of the rubber composition. The content of the organic peroxide as the crosslinker is 1 to 5 parts by mass with respect to 100 parts by mass of the rubber component of the rubber composition.

Examples of the vulcanization accelerator include a thiazole-based agent (e.g., MBT and MBTS), a thiuram-based agent (e.g., TT and TRA), a sulfenamide-based agent (e.g., CZ), and a dithiocarbamate-based agent (e.g., BZ-P). Suitably, the vulcanization accelerator is comprised of one kind or two or more kinds of these agents. The content of the vulcanization accelerator is 2 to 5 parts by mass with respect to 100 parts by mass of the rubber component of the rubber composition.

Although it is recommended that the rubber composition making the rubber cement adhesion layer 17 does not contain short fibers having a fiber diameter of greater than or equal to 10 μm, such short fibers may be contained in the rubber composition making the rubber cement adhesion layer 17 as long as the short fibers do not inhibit the adhesiveness of the cord 13 to the adhesive rubber layer 11 of the V-ribbed belt body 10. Further, the rubber composition making the adhesive rubber layer 11 may either contain or not contain the short fibers having the fiber diameter of greater than or equal to 10 μm. The rubber composition making the adhesive rubber layer 11 may either contain or not contain the cellulose-based fine fibers.

The backside reinforcing fabric 14 is made of fabric, such as woven fabric, knitted fabric, and unwoven fabric, made of yarn of cotton, polyamide fibers, polyester fibers, and aramid fibers, for example. The backside reinforcing fabric 14 undergoes an adhesion treatment so that it has adhesiveness to the V-ribbed belt body 10.

In a general power transmission belt, a cord is embedded in a belt body made of rubber such that the cord forms a helical pattern having a pitch in the belt width direction. Although the cord undergoes an adhesion treatment so that it adheres to the belt body, the cords on both sides of the belt in the belt width direction may be separated from the belt body if used under severe conditions, due to warping and concentration of tensile force on said cords. As a result, separation between layers may occur. However, according to the V-ribbed belt B of the first embodiment having the above configurations, the cord 13 is highly adhesive to the adhesive rubber layer 11 of the V-ribbed belt body 10 because the V-ribbed belt B of the first embodiment is configured such that the RFL adhesion layer 16 coating the cord 13 and containing the rubber component is in contact with the rubber cement adhesion layer 17 made of the rubber composition containing the cellulose-based fine fibers. As a result, separation between layers during the belt running may be reduced.

Figure 3:
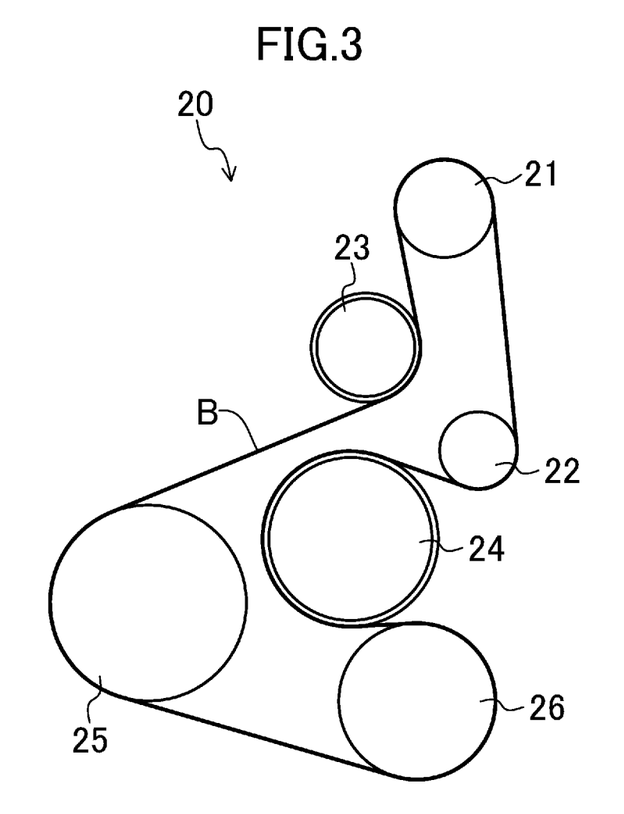
FIG. 3 illustrates a layout of pulleys of an accessory belt transmission system of an automobile using the V-ribbed belt according to the first embodiment.

FIG. 3 illustrates a layout of pulleys of an accessory belt transmission system 20 of an automobile using the V-ribbed belt B according to the first embodiment. The accessory belt transmission system 20 is a serpentine drive system in which the V-ribbed belt B is wrapped around six pulleys including four ribbed pulleys and two flat pulleys to transmit power.

The accessory belt transmission system 20 includes a power steering pulley 21, which is a ribbed pulley, at an uppermost position, and an AC generator pulley 22, which is a ribbed pulley, located below the power steering pulley 21. The system 20 also includes a tensioner pulley 23, which is a flat pulley, located at a lower left position of the power steering pulley 21, and a water pump pulley 24, which is a flat pulley, located below the tensioner pulley 23. The system further includes a crank shaft pulley 25, which is a ribbed pulley, located at a lower left position of the tensioner pulley 23, and an air conditioning pulley 26, which is a ribbed pulley, located at a lower right position of the crank shaft pulley 25. These pulleys are made, for example, of pressed metals or castings, or resin moldings using, e.g., nylon resin and phenol resin, with a pulley diameter φ of 50 to 150 mm.

In the accessory belt transmission system 20, the V-ribbed belt B is wrapped around the power steering pulley 21 with the V-shaped ribs 15 brought into contact with the power steering pulley 21, and then around the tensioner pulley 23 with the backside of the belt B brought into contact with the tensioner pulley 23. After that, the belt B is sequentially wrapped around the crank shaft pulley 25 and the air conditioning pulley 26 with the V-shaped ribs 15 brought into contact with the crank shaft pulley 25 and the air conditioning pulley 26, and further around the water pump pulley 24 with the backside of the belt B brought into contact with the water pump pulley 24. The belt B is then wrapped around the AC generator pulley 22 with the V-shaped ribs 15 brought into contact with the AC generator pulley 22, and returns to the power steering pulley 21 in the end. The belt span length, which is a length of the V-ribbed belt B between the pulleys, is 50 to 300 mm, for example. The degree of misalignment allowable between the pulleys is 0° to 2°.

(Method for Forming V-Ribbed Belt B)

A method for forming the V-ribbed belt B according to the first embodiment includes a material preparation step, a shaping step, a cross-linking step, a grinding step, and a finishing step.

<Material Preparation Step>

—Uncrosslinked Rubber Sheets 11', 12' for Making the Adhesive Rubber Layer 11 and the Compressed Rubber Layer 12—

Various compound ingredients are added to a rubber component, and the mixture is kneaded by a mixer, such as a kneader and a Banbury mixer. The resultant uncrosslinked rubber composition is turned into a sheet by calendering, for example, to form uncrosslinked rubber sheets 11', 12' for making an adhesive rubber layer 11 and a compressed rubber layer 12. Short fibers may be added to the uncrosslinked rubber sheet 12' in forming the compressed rubber layer 12 containing short fibers.

—Cord 13'—

The cord 13' undergoes an adhesion treatment. Specifically, the cord 13' undergoes an RFL adhesion treatment in which the cord 13' is soaked in an RFL aqueous solution and heated, and a rubber cement adhesion treatment in which the cord 13' is soaked in rubber cement and dried. Further, the cord 13' undergoes a primary coat adhesion treatment, as necessary, in which the cord 13' is soaked in a primary coat adhesion treatment fluid prior to the RFL adhesion treatment and heated.

<<Primary Coat Adhesion Treatment>>

The primary coat adhesion treatment fluid is made of a solution obtained by dissolving a primary coat adhesion treatment agent, such as epoxy resin and isocyanate resin (blocked isocyanate), in a solvent such as toluene, or a dispersion obtained by dispersing said agent in water. The temperature of the primary coat adhesion treatment fluid is 20 to 30° C., for example. The solid content concentration of the primary coat adhesion treatment fluid is suitably 20% by mass or less.

The period of soaking into the primary coat adhesion treatment fluid is 1 to 3 seconds, for example. The heating temperature (i.e., a furnace temperature) after the soaking into the primary coat adhesion treatment fluid is 200 to 250° C., for example. The period of heating (i.e., dwell time in the furnace) is 1 to 3 minutes, for example. The primary coat adhesion treatment may be conducted only once, or may be conducted a plurality of times. The primary coat adhesion treatment agent adheres to the cord 13'. The adhesion amount (i.e., coating weight) of the primary coat adhesion treatment agent is 0.5 to 8% by mass, for example, with respect to the mass of the fiber material making the cord 13'.

<<RFL Adhesion Treatment>>

The RFL aqueous solution is an aqueous solution obtained by adding rubber latex to an initial condensate of resorcin and formaldehyde. The temperature of the RFL aqueous solution is 20 to 30° C., for example. The solid content concentration of the RFL aqueous solution is suitably 30% by mass or less.

The molar ratio (R/F) between resorcin (R) and formalin (F) is 1/1 to 1/2, for example. Examples of the rubber latex include vinylpyridine-styrene-butadiene rubber latex (Vp-St-SBR), chloroprene rubber latex (CR), chlorosulfonated polyethylene rubber latex (CSM), etc. The mass ratio (RF/L) between the initial condensate (RF) of resorcin and formaldehyde and the rubber latex (L) is 1/5 to 1/20, for example.

The period of soaking into the RFL aqueous solution is 1 to 3 seconds, for example. The heating temperature (i.e., a furnace temperature) after the soaking into the RFL aqueous solution is 200 to 250° C., for example. The period of heating (i.e., dwell time in the furnace) is 1 to 3 minutes, for example. The RFL adhesion treatment may be conducted only once, or may be conducted a plurality of times. The RFL adhesion layer 16 adheres to the cord 13'. The adhesion amount (i.e., coating weight) of the RFL adhesion layer 16 is 2 to 5% by mass, for example, with respect to the mass of the fiber material making the cord 13'.

<<Rubber Cement Adhesion Treatment>>

The rubber cement is a solution obtained by dissolving, in a solvent such as toluene, the uncrosslinked rubber composition, which is the not-yet-crosslinked rubber composition that makes the rubber cement adhesion layer 17 and contains the cellulose-based fine fibers. The rubber cement is prepared in the following manner.

First, cellulose-based fine fibers are added to a rubber component which is being masticated, and the cellulose-based fine fibers are dispersed by kneading the rubber component.

Examples of methods for dispersing the cellulose-based fine fibers in the rubber component include: adding a dispersion (gel) obtained by dispersing the cellulose-based fine fibers in water, to a rubber component which is being masticated by open rolls, and vaporizing moisture while keeping the kneading of the dispersion and the rubber component; adding, to a rubber component which is being masticated, a master batch of cellulose-based fine fibers and rubber obtained by blending a dispersion (gel), obtained by dispersing the cellulose-based fine fibers in water, with rubber latex and vaporizing moisture from the blend; adding, to a rubber component which is being masticated, a master batch of cellulose-based fine fibers and rubber obtained by blending a dispersion, obtained by dispersing hydrophobized cellulose-based fine fibers in a solvent, with a solution obtained by dissolving a rubber component in a solvent, and vaporizing the solvents from the blend; adding, to a rubber component which is being masticated, a final product obtained by freezing and powdering a dispersion (gel) obtained by dispersing cellulose-based fine fibers in water; and adding a hydrophobized cellulose-based fine fibers to a rubber component which is being masticated.

Next, various compound ingredients are added to the blend of the rubber component and the cellulose-base fine fibers while the blend is kneaded, and the kneading is continuously performed.

The resultant uncrosslinked rubber composition is added to a solvent, which is agitated until it becomes a uniformly blended solution. The rubber cement is prepared in this manner. The temperature of the rubber cement is 20 to 30° C., for example.

The solid content concentration of the rubber cement is suitably 3% by mass or more and more suitably 5% by mass or more, and suitably 14% by mass or less and more suitably 12% by mass or less.

The period of soaking into the rubber cement is 1 to 3 seconds, for example. The drying temperature (i.e., a furnace temperature) after the soaking into the rubber cement is 50 to 100° C., for example. The period for drying (i.e., dwell time in the furnace) is 1 to 3 minutes, for example. The rubber cement adhesion treatment may be conducted only once, or may be conducted a plurality of times. The rubber cement adhesion layer 17 adheres to the cord 13'. The adhesion amount (i.e., coating weight) of the rubber cement adhesion layer 17 is 2 to 5% by mass, for example, with respect to the mass of the fiber material making the cord 13'.

—Backside Reinforcing Fabric 14'—

The backside reinforcing fabric 14' undergoes an adhesion treatment. Specifically, the backside reinforcing fabric 14' undergoes one kind or two or more kinds of the following treatments: a primary coat adhesion treatment in which the fabric 14' is soaked in a primary coat adhesion treatment fluid and heated; an RFL adhesion treatment in which the fabric 14' is soaked in an RFL aqueous solution and heated; a rubber cement adhesion treatment by soaking in which the fabric 14' is soaked in rubber cement and dried; and a rubber cement adhesion treatment by coating in which rubber cement is applied to a surface of the fabric 14' on a side facing the V-ribbed belt body 10 and dried.

<Shaping Step>

Figure 4:
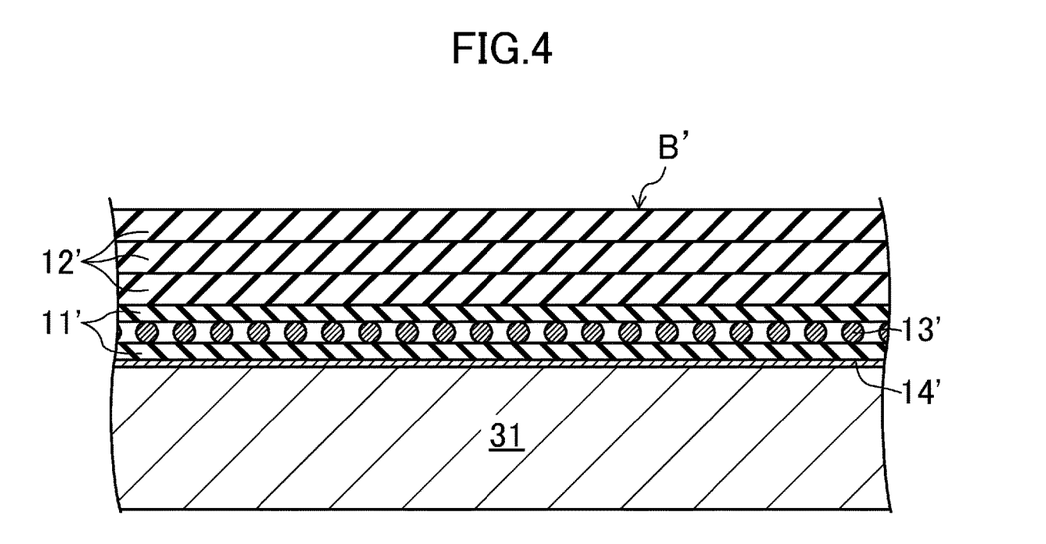
FIG. 4 is a first drawing for explaining a method for forming the V-ribbed belt according to the first embodiment.

As illustrated in FIG. 4, the backside reinforcing fabric 14' and the uncrosslinked rubber sheet 11' for making the adhesive rubber layer 11 are sequentially wrapped around a cylindrical mold 31 so that they are layered on the outer surface of the cylindrical mold 31. The cord 13' is wrapped around the resultant layers on the mold 31 in a helical manner with a predetermined tension applied to the cord 13'. Further, the uncrosslinked rubber sheet 11' for making the adhesive rubber layer 11 and the uncrosslinked rubber sheet 12' for making the compressed rubber layer 12 are sequentially wrapped around, and layered on, the cylindrical mold 31, thereby obtaining a belt formation body B'.

<Cross-Linking Step>

Figure 5:
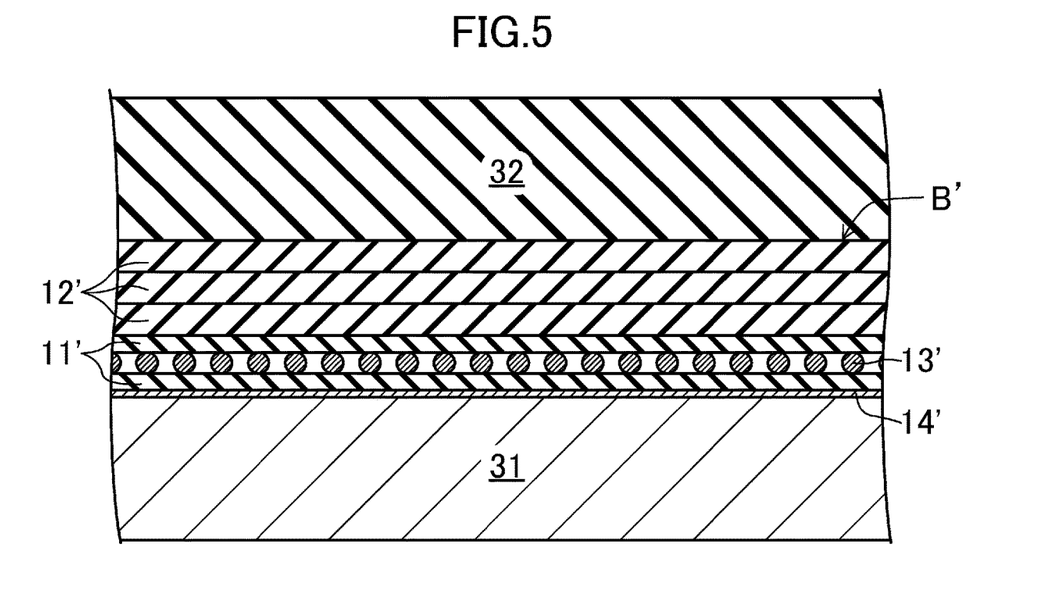
FIG. 5 is a second drawing for explaining the method for forming the V-ribbed belt according to the first embodiment.
Figure 6:
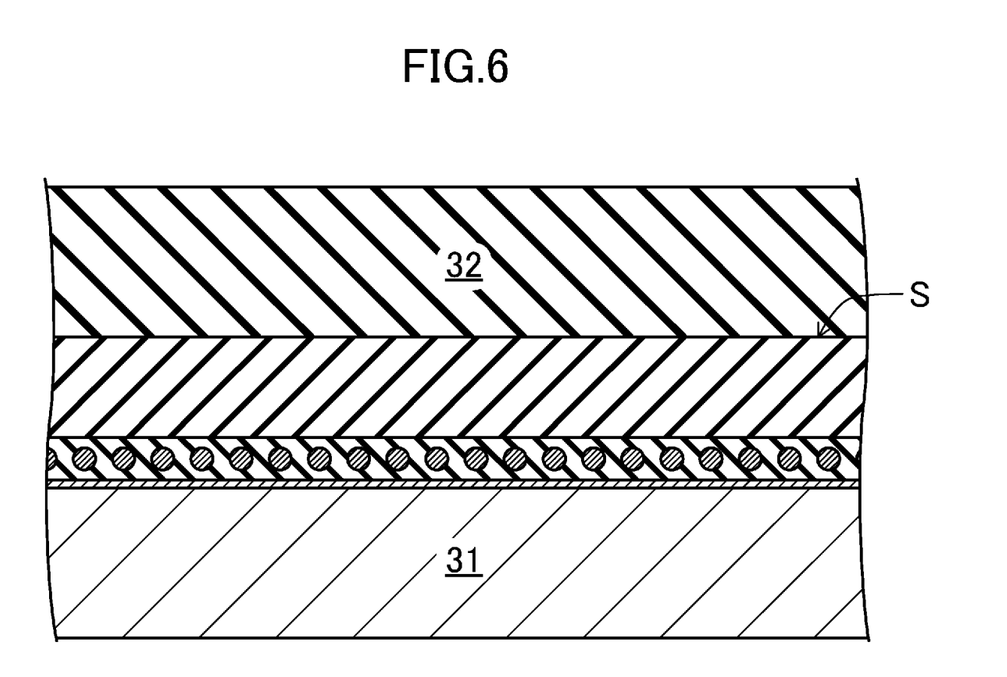
FIG. 6 is a third drawing for explaining the method for forming the V-ribbed belt according to the first embodiment.

As illustrated in FIG. 5, a rubber sleeve 32 is placed on the belt formation body B'. The belt formation body B' with the rubber sleeve 32 is placed in a vulcanizer, and the vulcanizer is sealed. The vulcanizer is filled with high-temperature and high-pressure steam, and the belt formation body B' with the rubber sleeve 32 is held in the vulcanizer for a predetermined molding time. At this moment, cross-linking is promoted in the uncrosslinked rubber sheets 11' and 12', and the uncrosslinked rubber sheets 11' and 12' are integrated with each other and combined with the cord 13' and the backside reinforcing fabric 14'. As a result, a cylindrical belt slab S is formed as illustrated in FIG. 6.

<Grinding Step>

Figure 7:
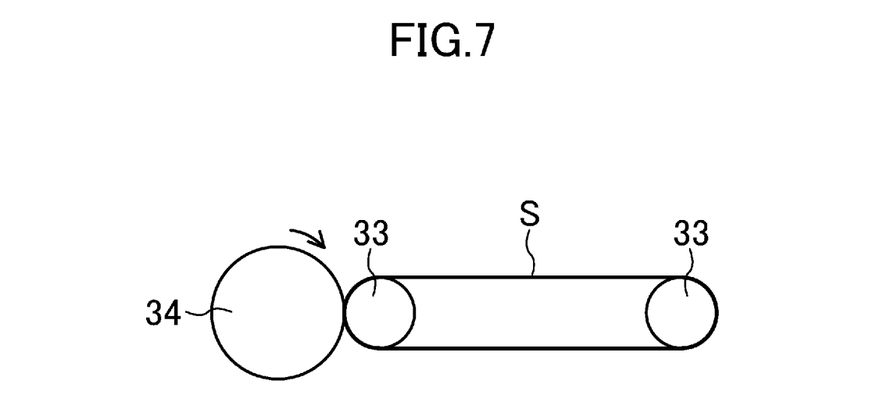
FIG. 7 is a fourth drawing for explaining the method for forming the V-ribbed belt according to the first embodiment.
Figure 8:
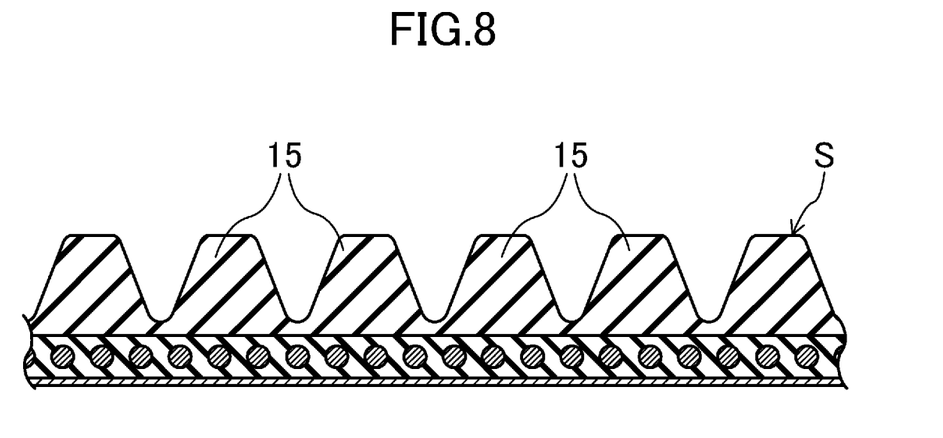
FIG. 8 is a fifth drawing for explaining the method for forming the V-ribbed belt according to the first embodiment.

The steam is released from the vulcanizer to end the state of sealing. The belt slab S formed on the cylindrical mold 31 is removed from the mold, and is looped over a pair of slab holding shafts 33 as shown in FIG. 7. A grinding stone 34, which has V-shaped rib formation grooves extending in a circumferential direction of the grinding stone 34 and arranged next to one another in the axial direction of the grinding stone 34, is rotated and brought into contact with the outer surface of the belt slab S, while the belt slab S is also rotated on the pair of slab holding shafts 33, thereby grinding the belt slab S all over the outer surface thereof. As a result, V-shaped ribs 15 are formed on the outer surface of the belt slab S as illustrated in FIG. 8. If necessary, the belt slab S may be cut into pieces in its lengthwise direction for grinding.

<Finishing Step>

The belt slab S in which the V-shaped ribs 15 are formed by grinding is cut into pieces having a predetermined width, and turned inside out. The V-ribbed belt B is formed in this manner.

Second Embodiment (V-Ribbed Belt B)

A V-ribbed belt B (a power transmission belt) according to a second embodiment has the same appearance as the V-ribbed belt B of the first embodiment. Thus, the second embodiment will be described based on FIG. 1.

In the V-ribbed belt B according to the second embodiment, the adhesive rubber layer 11 included in the V-ribbed belt body 10 is made of a rubber composition obtained by heating and pressing an uncrosslinked rubber composition prepared by kneading a rubber component into which various compound ingredients are blended in addition to the cellulose-based fine fibers, and then crosslinking the kneaded product with a crosslinker. The constituents of the rubber composition making the adhesive rubber layer 11 are the same as the constituents of the rubber composition making the rubber cement adhesion layer 17 in the first embodiment.

Figure 9:
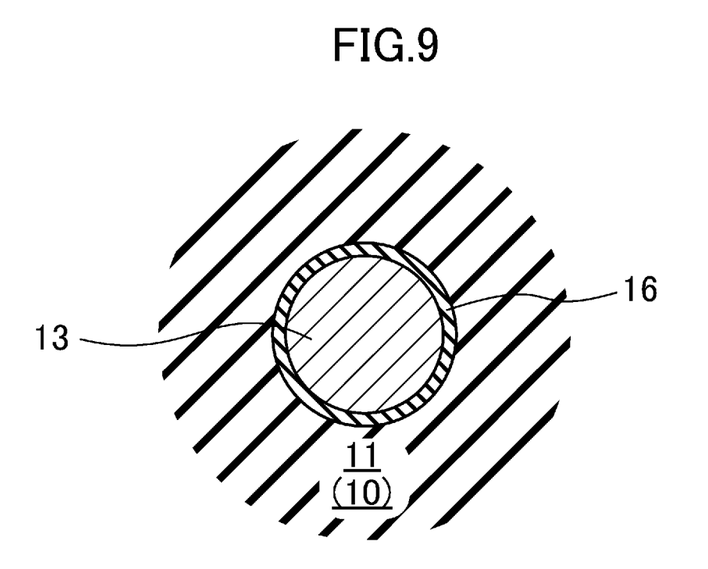
FIG. 9 illustrates a cross-sectional view of an interface structure between a cord and an adhesive rubber layer according to a second embodiment.

In the V-ribbed belt B according to the second embodiment, the cord 13 undergoes an RFL adhesion treatment in which the cord 13 is soaked in an RFL aqueous solution and heated. Thus, as illustrated in FIG. 9, the cord 13 is coated with the RFL adhesion layer 16 formed by the RFL adhesion treatment and containing the rubber component. The RFL adhesion layer 16 is in contact with the adhesive rubber layer 11 made of the rubber composition containing the cellulose-based fine fibers.

The cord 13 may undergo a rubber cement adhesion treatment in which the cord 13 is soaked in rubber cement and dried, in addition to the RFL adhesion treatment. In this case, similarly to the first embodiment shown in FIG. 2, the cord 13 is coated with the RFL adhesion layer 16 formed by the RFL adhesion treatment, and also with the rubber cement adhesion layer 17 formed by the rubber cement adhesion treatment and containing the rubber component. The rubber cement adhesion layer 17 is in contact with the adhesive rubber layer 11 made of the rubber composition containing the cellulose-based fine fibers. Similarly to the first embodiment, the rubber cement adhesion layer 17 may either contain or not contain the cellulose-based fine fibers. Suitably, the rubber component of the rubber composition that makes the rubber cement adhesion layer 17 is the same as the rubber component of the rubber composition that makes the adhesive rubber layer 11 which comes in contact with the rubber cement adhesion layer 17.

Note that similarly to the first embodiment, the cord 13 may undergo a primary coat adhesion treatment prior to the RFL adhesion treatment, so that a primary coat is formed under the RFL adhesion layer 16. In the primary coat adhesion treatment, the cord 13 is immersed in a primary coat adhesion treatment fluid made of a solution obtained by dissolving a primary coat adhesion treatment agent, such as epoxy resin and isocyanate resin (blocked isocyanate), in a solvent such as toluene, or a dispersion obtained by dispersing said agent in water.

The other configurations are the same as those of the first embodiment.

According to the V-ribbed belt B of the second embodiment having the above configurations, the cord 13 is highly adhesive to the adhesive rubber layer 11 of the V-ribbed belt body 10 because the V-ribbed belt B of the second embodiment is configured such that the RFL adhesion layer 16 or the rubber cement adhesion layer 17 coating the cord 13 and containing the rubber component is in contact with the adhesive rubber layer 11 made of the rubber composition containing the cellulose-based fine fibers. As a result, separation between layers during the belt running may be reduced.

(Method for Making V-Ribbed Belt B)

According to a method for forming the V-ribbed belt B according to the second embodiment, the sheet 11' for making the adhesive rubber layer 11 is prepared in the material preparation step in the following manner.

First, cellulose-based fine fibers are added to a rubber component while the rubber component is being masticated, and the cellulose-based fine fibers are dispersed by kneading the rubber component.

Examples of methods for dispersing the cellulose-based fine fibers in the rubber component include: adding a dispersion (gel) obtained by dispersing the cellulose-based fine fibers in water, to a rubber component which is being masticated by open rolls, and vaporizing moisture while keeping the kneading of the dispersion and the rubber component; adding, to a rubber component which is being masticated, a master batch of cellulose-based fine fibers and rubber obtained by blending a dispersion (gel), obtained by dispersing the cellulose-based fine fibers in water, with rubber latex and vaporizing moisture from the blend; adding, to a rubber component which is being masticated, a master batch of cellulose-based fine fibers and rubber obtained by blending a dispersion, obtained by dispersing cellulose-based fine fibers in a solvent, with a solution obtained by dissolving a rubber component in a solvent, and vaporizing the solvents from the blend; adding, to a rubber component which is being masticated, a final product obtained by freezing and powdering a dispersion (gel) obtained by dispersing cellulose-based fine fibers in water; and adding a hydrophobized cellulose-based fine fibers to a rubber component which is being masticated.

Next, various compound ingredients are added to the blend of the rubber component and the cellulose-base fine fibers while the blend is kneaded, and the kneading is continuously performed. The uncrosslinked rubber composition is prepared in this manner.

The obtained uncrosslinked rubber composition is shaped into a sheet by a calender, for example.

According to the method for forming the V-ribbed belt B of the second embodiment, the uncrosslinked rubber sheet 11' for making the adhesive rubber layer 11 obtained in this manner may be used in such a manner that its grain direction corresponds to the belt length direction, or that its grain direction corresponds to the belt width direction.

The other configurations are the same as those of the first embodiment.

Other Embodiments

The V-ribbed belts B have been described as non-limiting examples of the power transmission belt in the first and second embodiments. The power transmission belt may also be a raw edge V-belt, a wrapped V-belt, a flat belt, and a toothed belt.

EXAMPLES

Uncrosslinked Rubber Composition

Uncrosslinked rubber compositions of the following rubbers 1 to 8 were prepared. Constituents of each rubber will also be shown in Table 1.

<Rubber 1>

Dispersions obtained by dispersing cellulose powder made from wood (trade name: KC Flock W-50GK manufactured by Nippon Paper Industries Co., Ltd.) in toluene were prepared. The dispersions were brought to collide with each other using a high-pressure homogenizer so that the cellulose powder was defibrated into cellulose fine fibers, thereby obtaining a dispersion in which cellulose fine fibers are dispersed in toluene. This means that the cellulose fine fibers are formed by a mechanically-defibrating means, and are not hydrophobically treated.

Next, the dispersion obtained by dispersing the cellulose fine fibers in toluene and a solution obtained by dissolving ethylene-propylene-diene monomer (trade name: EP33 manufactured by JSR Corporation, hereinafter referred to as "EPDM") in toluene were blended. Toluene was vaporized from the blend, thereby preparing a master batch of cellulose fine fibers and EPDM.

Subsequently, EPDM was masticated, and the master batch was added to the EPDM which is being masticated. The amount of the master batch added to the EPDM was determined so that 1 part by mass of the cellulose fine fibers was blended into 100 parts by mass of the EPDM, which is a total amount of the EPDM.

Then, the EPDM and the cellulose fine fibers were kneaded and the following ingredients were added thereto with respect to 100 parts by mass of the EPDM: 70 parts by mass of GPF carbon black (trade name: DIABLACK G manufactured by Mitsubishi Chemical Corporation) as a reinforcing material; 30 parts by mass of oil (trade name: SUMPAR 2280 manufactured by Japan Sun Oil Company, Ltd.); 1 part by mass of stearic acid (manufactured by Kao Corporation) as a processing aid; 5 parts by mass of zinc oxide (manufactured by Sakai Chemical Industry Co., Ltd.) as a vulcanization accelerator aid; 3 parts by mass of sulfur (manufactured by Hosoi Chemical Industry Co., Ltd.) as a crosslinker; and 2.5 parts by mass of a thiuram-based vulcanization accelerator (trade name: NOCCELER TET-G manufactured by Ouchi Shinko Chemical Industrial Co., Ltd.). Kneading is continuously performed. An uncrosslinked rubber composition was prepared in this manner. This uncrosslinked rubber composition was referred to as "Rubber 1."

<Rubber 2>

An uncrosslinked rubber composition prepared in a manner similar to preparing Rubber 1 except that 3 parts by mass of cellulose fine fibers were blended into 100 parts by mass of EPDM, was referred to as "Rubber 2."

fibers made from cotton underwear which had been powdered to 60 mesh by a grinder was used instead of polyester short fibers, was referred to as "Rubber 6."

<Rubber 7>

An uncrosslinked rubber composition prepared in a manner similar to preparing Rubber 5 except that nylon 66 short fibers (trade name: Leona manufactured by Asahi Kasei Corporation) were used instead of polyester short fibers, was referred to as "Rubber 7."

<Rubber 8>

EPDM was masticated and the following ingredients were added thereto with respect to 100 parts by mass of the EPDM: 70 parts by mass of GPF carbon black as a reinforcing material; 30 parts by mass of oil; 1 part by mass of stearic acid as a processing aid; 5 parts by mass of zinc oxide as a vulcanization accelerator aid; 3 parts by mass of sulfur as a crosslinker; and 2.5 parts by mass of a vulcanization accelerator. The EPDM with these ingredients was kneaded, thereby preparing an uncrosslinked rubber composition. This uncrosslinked rubber composition was referred to as "Rubber 8."

TABLE 1

|  | Rubber 1 | Rubber 2 | Rubber 3 | Rubber 4 | Rubber 5 | Rubber 6 | Rubber 7 | Rubber 8 |
| --- | --- | --- | --- | --- | --- | --- | --- | --- |
| EDPM | 100 | 100 | 100 | 100 | 100 | 100 | 100 | 100 |
| Cellulose Microfilaments | 1 | 3 | 5 |  |  |  |  |  |
| Polyester Short Fibers |  |  |  | 3 | 5 |  |  |  |
| Cotton Short Fibers |  |  |  |  |  | 5 |  |  |
| Nylon 66 Short Fibers |  |  |  |  |  |  | 5 |  |
| GPF Carbon Black | 70 | 70 | 70 | 70 | 70 | 70 | 70 | 70 |
| Oil | 30 | 30 | 30 | 30 | 30 | 30 | 30 | 30 |
| Stearic Acid | 1 | 1 | 1 | 1 | 1 | 1 | 1 | 1 |
| Zinc Oxide | 5 | 5 | 5 | 5 | 5 | 5 | 5 | 5 |
| Sulfur | 2.5 | 2.5 | 2.5 | 2.5 | 2.5 | 2.5 | 2.5 | 2.5 |
| Thiuram-based Vulcanization Accelerator | 3 | 3 | 3 | 3 | 3 | 3 | 3 | 3 |

<Rubber 3>

An uncrosslinked rubber composition prepared in a manner similar to preparing Rubber 1 except that 5 parts by mass of cellulose fine fibers were blended into 100 parts by mass of EPDM, was referred to as "Rubber 3."

<Rubber 4>

EPDM was masticated and the following ingredients were added thereto with respect to 100 parts by mass of the EPDM: 70 parts by mass of GPF carbon black as a reinforcing material; 30 parts by mass of oil; 1 part by mass of stearic acid as a processing aid; 5 parts by mass of zinc oxide as a vulcanization accelerator aid; 3 parts by mass of sulfur as a crosslinker; 2.5 parts by mass of a vulcanization accelerator; and 3 parts by mass of polyester short fibers (trade name: Tetron manufactured by TEUIN LIMITED). The EPDM with these ingredients was kneaded, thereby preparing an uncrosslinked rubber composition. This uncrosslinked rubber composition was referred to as "Rubber 4."

<Rubber 5>

An uncrosslinked rubber composition prepared in a manner similar to preparing Rubber 4 except that 5 parts by mass of polyester short fibers were blended into 100 parts by mass of EPDM, was referred to as "Rubber 5."

<Rubber 6>

An uncrosslinked rubber composition prepared in a manner similar to preparing Rubber 5 except that cotton short (V-Ribbed Belt B)

V-ribbed belts of the following Examples 1 to 4 and Comparative Examples 1 to 5 were prepared. Constituents of each V-ribbed belt will also be shown in Table 2.

Example 1

A V-ribbed belt of Example 1 having three V-shaped ribs was prepared in a manner similar to that of the first embodiment. A cord used in this V-ribbed belt was made of plied yarn of polyester fibers, and underwent a primary coat adhesion treatment, an RFL adhesion treatment, and a rubber cement adhesion treatment which will be described below.

In the primary coat adhesion treatment, a solution obtained by dissolving isocyanate resin (trade name: Sumidur manufactured by Sumitomo Bayer Urethane Co., Ltd.), which is a primary coat adhesion treatment agent, in toluene as a solvent was used as a primary coat adhesion treatment fluid. The temperature of the primary coat adhesion treatment fluid was 25° C. The period of soaking into the primary coat adhesion treatment fluid was 5 seconds. The heating temperature after the soaking into the primary coat adhesion treatment fluid was 250° C., and the period of heating was 40 seconds. The primary coat adhesion treatment was performed once. The adhesion amount (i.e., coating weight) of the primary coat adhesion treatment agent which adhered to the cord through the primary coat adhesion treatment was 4% by mass with respect to the mass of the polyester fibers making the cord.

In the RFL adhesion treatment, an RFL aqueous solution having a solid content concentration of 20% by mass was used, wherein latex (L) was vinylpyridine-styrene-butadiene rubber latex (trade name: Nipol 2518FS manufactured by Zeon Corporation; the molar ratio (R/F) between resorcin (R) and formalin (F) was 1/1.2; and the mass ratio (RF/L) between an initial condensate (RF) of resorcin and formalin and rubber latex (L) was 1/10. The temperature of the RFL aqueous solution was 25° C. The period of soaking into the RFL aqueous solution was 5 seconds. The heating temperature after the soaking into the RFL aqueous solution was 250° C., and the period of heating was 40 seconds. The RFL adhesion treatment was performed twice. The adhesion amount (i.e., coating weight) of the RFL adhesion layer which adhered to the cord through the RFL adhesion treatment was 4% by mass with respect to the mass of the polyester fibers making the cord.

In the rubber cement adhesion treatment, rubber cement having a solid content concentration of 10% by mass obtained by dissolving Rubber 1 in toluene as a solvent was used. The temperature of the rubber cement was 25° C. The period of soaking into the rubber cement was 5 seconds. The drying temperature after the soaking into the rubber cement was 100° C., and the period of drying was 40 seconds. The rubber cement adhesion treatment was performed once. The adhesion amount (i.e., coating weight) of the rubber cement adhesion layer 17 which adhered to the cord through the rubber cement adhesion treatment was 4% by mass with respect to the mass of the polyester fibers making the cord.

As described above, in the V-ribbed belt of Example 1, the rubber cement made of Rubber 1 is used in the rubber cement adhesion treatment. The rubber cement adhesion layer is therefore made of a rubber composition containing the cellulose fine fibers.

An adhesive rubber layer was made using Rubber 8. The compressed rubber layer was made using another EPDM composition containing nylon short fibers. The backside reinforcing fabric was made using woven fabric of nylon fibers. The backside reinforcing fabric underwent an RFL adhesion treatment and a rubber cement adhesion treatment by soaking.

Example 2

A V-ribbed belt of Example 2 was prepared which has the same constituents as those of the V-ribbed belt of Example 1 except that rubber cement obtained by dissolving Rubber 2 in toluene was used in the rubber cement adhesion treatment for the cord. Thus, in the V-ribbed belt of Example 2, the rubber cement adhesion layer is made of a rubber composition containing the cellulose fine fibers.

Example 3

A V-ribbed belt of Example 3 was prepared which has the same constituents as those of the V-ribbed belt of Example 1 except that rubber cement obtained by dissolving Rubber 3 in toluene was used in the rubber cement adhesion treatment for the cord. Thus, in the V-ribbed belt of Example 3, the rubber cement adhesion layer is made of a rubber composition containing the cellulose fine fibers.

Example 4

A V-ribbed belt of Example 4 was prepared which has the same constituents as those of the V-ribbed belt of Example 1 except that the adhesive rubber layer was made using Rubber 1 and that rubber cement obtained by dissolving Rubber 8 in toluene was used in the rubber cement adhesion treatment for the cord. Thus, in the V-ribbed belt of Example 4, the rubber cement adhesion layer is made of a rubber composition not containing the cellulose fine fibers, but the adhesive rubber layer is made of a rubber composition containing the cellulose fine fibers.

Comparative Example 1

A V-ribbed belt of Comparative Example 1 was prepared which has the same constituents as those of the V-ribbed belt of Example 1 except that rubber cement obtained by dissolving Rubber 8 in toluene was used in the rubber cement adhesion treatment for the cord. Thus, in the V-ribbed belt of Comparative Example 1, both of the adhesive rubber layer and the rubber cement adhesion layer are made of rubber compositions not containing cellulose fine fibers.

Comparative Example 2

A V-ribbed belt of Comparative Example 2 was prepared which has the same constituents as those of the V-ribbed belt of Example 1 except that rubber cement obtained by dissolving Rubber 4 in toluene was used in the rubber cement adhesion treatment for the cord. Thus, in the V-ribbed belt of Comparative Example 2, the rubber cement adhesion layer is made of a rubber composition containing the polyester short fibers.

Comparative Example 3

A V-ribbed belt of Comparative Example 3 was prepared which has the same constituents as those of the V-ribbed belt of Example 1 except that rubber cement obtained by dissolving Rubber 5 in toluene was used in the rubber cement adhesion treatment for the cord. Thus, in the V-ribbed belt of Comparative Example 3, the rubber cement adhesion layer is made of a rubber composition containing the polyester short fibers.

Comparative Example 4

A V-ribbed belt of Comparative Example 4 was prepared which has the same constituents as those of the V-ribbed belt of Example 1 except that rubber cement obtained by dissolving Rubber 6 in toluene was used in the rubber cement adhesion treatment for the cord. Thus, in the V-ribbed belt of Comparative Example 4, the rubber cement adhesion layer is made of a rubber composition containing the cotton short fibers.

Comparative Example 5

A V-ribbed belt of Comparative Example 5 was prepared which has the same constituents as those of the V-ribbed belt of Example 1 except that rubber cement obtained by dissolving Rubber 7 in toluene was used in the rubber cement adhesion treatment for the cord. Thus, in the V-ribbed belt of Comparative Example 5, the rubber cement adhesion layer is made of a rubber composition containing the nylon short fibers.

TABLE 2

| | Example | | | | Comparative Example | | | | |
|---|---|---|---|---|---|---|---|---|---|
| | 1 | 2 | 3 | 4 | 1 | 2 | 3 | 4 | 5 |
| Rubber Cement Adhesion Layer | Rubber 1 | Rubber 2 | Rubber 3 | Rubber 8 | Rubber 8 | Rubber 4 | Rubber 5 | Rubber 6 | Rubber 7 |
| Adhesive Rubber Layer | Rubber 8 | Rubber 8 | Rubber 8 | Rubber 3 | Rubber 8 | Rubber 8 | Rubber 8 | Rubber 8 | Rubber 8 |

(Test Evaluation Method)

<Kneadability>

Kneadability of Rubbers 1 to 7 was evaluated. "A" represents good kneadability and "B" represents poor kneadability.

<Average Fiber Diameter and Distribution of Fiber Diameters>

For each of Rubber 3 and Rubbers 5 to 7, a sample of a crosslinked rubber composition was frozen and powdered, and the cross-section was observed with a transmission electron microscope (TEM). Fifty fibers were selected arbitrarily to measure the fiber diameters. The number-average fiber diameter of the arbitrarily-selected 50 fibers was calculated to determine an average fiber diameter.

For Rubber 3, the maximum fiber diameter and the minimum fiber diameter among the fiber diameters of the 50 cellulose fine fibers were obtained.

<Adhesion Strength>

Figure 10:
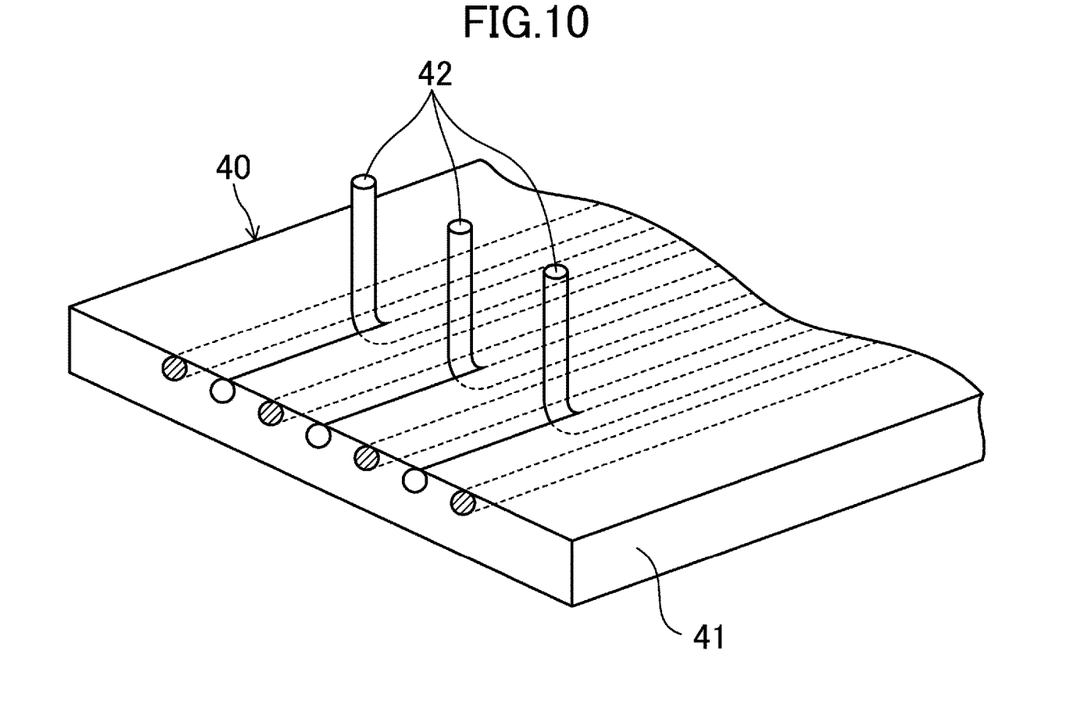
FIG. 10 illustrates a perspective view of a test piece for use in an adhesion test.

The uncrosslinked rubber sheets for making the adhesive rubber layers and the cords which underwent adhesion treatments used to prepare V-ribbed belts of Examples 1 to 4 and Comparative Examples 1 to 5 were used to form, by press-forming, adhesion test pieces 40, in each of which seven cords 42 are buried in a surface of the plate-like rubber 41 in parallel with one another with intervals as illustrated in FIG. 10. The press-forming was performed under the conditions of a temperature of 160° C., a pressure of 2.9 MPa, and a period of 30 minutes.

For each of the adhesion test pieces 40, the plate-like rubber 41 was secured to one of the chucks of a tensile tester, and alternately-arranged three cords 42 of the seven cords 42 buried in the plate-like rubber 41 were pulled out to form a 90 degree angle with respect to the plate-like rubber 41 and secured to the other chuck of the tensile tester. Then, the three cords 42 were peeled from the plate-like rubber 41 by a length of 100 mm at a peeling speed of 50 mm/min. The average of peak values while the peel lengths were between 10 mm and 100 mm was determined to be adhesion strength. In addition, whether the state of fracture after the peeling of the cords was cohesive fracture or interfacial fracture was evaluated by visual check.

<Belt Running Test>

Figure 11:
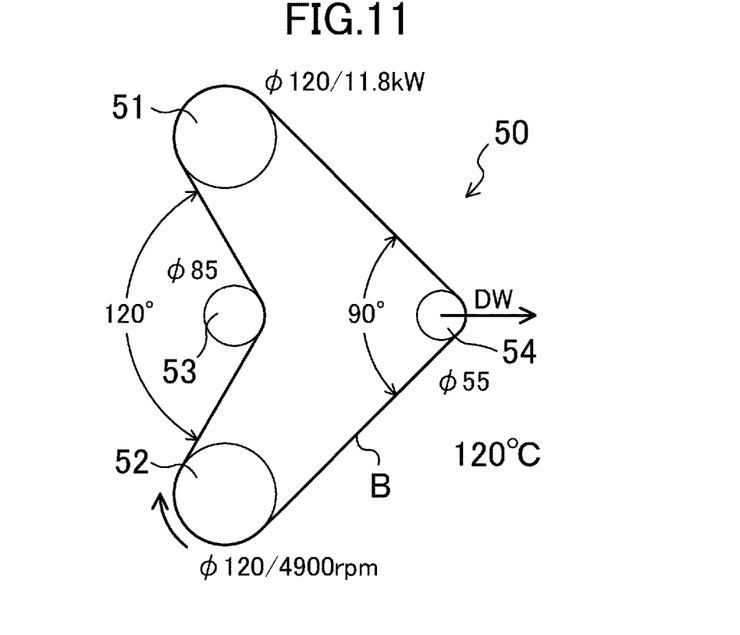
FIG. 11 illustrates a layout of pulleys of a belt running tester.

FIG. 11 illustrates a layout of pulleys of a belt running tester 50.

The belt running tester 50 includes a first ribbed driven pulley 51 with a diameter of 120 mm provided at a uppermost position, a ribbed drive pulley 52 with a diameter of 120 mm provided so as to align with the pulley 51 in a vertical direction, an idler pulley 53 with a diameter of 80 mm provided in the middle of the pulleys 51 and 52 in the vertical direction, and a second ribbed driven pulley 54 with a diameter of 55 mm provided on the right of the pulley 53. The V-ribbed belt B is wrapped around the above pulleys such that: its V-shaped ribs come into contact with the first ribbed driven pulley 51, the ribbed drive pulley 52, and the second ribbed driven pulley 54; its backside comes into contact with the idler pulley 53; the wrap-around angle of the V-ribbed belt B over the second ribbed driven pulley 54 is 90 degrees; and the wrap-around angle over the idler pulley 53 is 120 degrees.

Each of the V-ribbed belts B of the Examples 1 to 4 and Comparative Examples 1 to 5 was wrapped around the first ribbed driven pulley 51, ribbed drive pulley 52, idler pulley 53, and second ribbed driven pulley 54 of the belt running tester 50. The second ribbed driven pulley 54 was pulled laterally, thereby applying a dead weight of 785 N to the pulley 54, and a rotation load of 11.8 kW was applied to the first ribbed driven pulley 51. In this state, the ribbed drive pulley 52 was rotated counterclockwise at 4900 rpm at the ambient temperature of 120° C. The V-ribbed belt B was kept running until the belt B became unable to run due to separation between layers. A period of belt running until the time when the belt B became unable to run was measured as belt endurance time.

(Test Evaluation Results)

The test results are shown in Tables 3 and 4.

TABLE 3

| | Rubber 1 | Rubber 2 | Rubber 3 | Rubber 4 | Rubber 5 | Rubber 6 | Rubber 7 | Rubber 8 |
|---|---|---|---|---|---|---|---|---|
| Kneadability | A | A | A | B | B | B | B | A |
| Average Fiber Diameter | — | — | 75 nm | — | 20 μm | 15 μm | 27 μm | — |
| Fiber Diameter minimum | — | — | 10 nm | — | — | — | — | — |
| Fiber Diameter maximum | — | — | 700 nm | — | — | — | — | — |

TABLE 4

|  | Example | | | | Comparative Example | | | | |
| --- | --- | --- | --- | --- | --- | --- | --- | --- | --- |
|  | 1 | 2 | 3 | 4 | 1 | 2 | 3 | 4 | 5 |
| Adhesion Strength (N/3 cords) | 240 | 238 | 252 | 240 | 205 | 145 | 103 | 105 | 112 |
| Fracture State | Cohesive | Cohesive | Cohesive | Cohesive | Cohesive | Interfacial | Interfacial | Interfacial | Interfacial |
| Belt Lifetime (Hour) | 703 | 775 | 729 | 787 | 185 | 178 | 165 | 158 | 162 |

Table 3 shows that Rubbers 1 to 3 containing the cellulose fine fibers exhibit good kneadability, but that Rubbers 4 and 5 containing polyester short fibers, Rubber 6 containing cotton short fibers, and Rubber 7 containing nylon 66 short fibers exhibit poor kneadability. Rubber 8 exhibits good kneadability since it does not contain the cellulose fine fibers and any other short fibers. Table 3 also shows that the cellulose fine fibers contained in Rubber 3 has a wide range of distribution of the fiber diameters.

Table 4 shows that the belts have good resistance to separation in Examples 1 to 3 in which the rubber cement adhesion layer is made of Rubbers 1 to 3 containing the cellulose fine fibers, and Example 4 in which the adhesive rubber layer is made of Rubber 3, because the adhesion strength is relatively high and the lifetime of the belt is long in these Examples. On the other hand, Table 4 also shows that the belts have poor resistance to separation in Comparative Examples 2 to 5 in which the rubber cement adhesion layer is made of Rubbers 4 and 5 containing polyester short fibers, Rubber 6 containing cotton short fibers, and Rubber 7 containing nylon 66 short fibers, because the adhesion strength is relatively low and the lifetime of the belt is short in these Comparative Examples. Table 4 also shows that the belt has poor resistance to separation in Comparative Example 1 in which the rubber cement adhesion layer and the adhesive rubber layer are made of Rubber 8 not containing the cellulose fine fibers and any other short fibers, because although the belt has relatively high adhesion strength, the lifetime of the belt is short.

The present invention is useful in the technical field of power transmission belts.

The embodiments have been described above as example techniques of the present disclosure, in which the attached drawings and the detailed description are provided. As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential. Since the embodiments described above are intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

The invention claimed is:

1. A power transmission belt having a belt body made of rubber, and a cord embedded in the belt body so as to form a helical pattern having a pitch in a belt width direction, wherein the cord is coated with an adhesion layer containing a rubber component, and the adhesion layer is in contact coated with a rubber composition separate from the belt body containing cellulose-based fine fibers.

2. The power transmission belt of claim 1, wherein a range of distribution of fiber diameters of the cellulose-based fine fibers includes 50 to 500 nm.

3. The power transmission belt of claim 1, wherein the cellulose-based fine fibers have an average fiber diameter of 10 to 100 nm.

4. The power transmission belt of claim 1, wherein the cellulose-based fine fibers are formed by a mechanically-defibrating means.

5. The power transmission belt of claim 1, wherein the cellulose-based fine fibers are not hydrophobically treated.

6. The power transmission belt of claim 1, wherein a content of the cellulose-based fine fibers in the rubber composition is 1 to 30 parts by mass with respect to 100 parts by mass of a rubber component of the rubber composition.

7. The power transmission belt of claim 1, wherein the cellulose-based fine fibers contained in the rubber composition are not oriented.

8. The power transmission belt of claim 1, wherein the rubber composition containing the cellulose-based fine fibers does not contain short fibers having a fiber diameter of 10 µm or more.

9. The power transmission belt of claim 1, wherein the adhesion layer is an RFL adhesion layer formed by an RFL adhesion treatment performed on the cord.

10. The power transmission belt of claim 9, wherein the rubber composition is a rubber composition that makes a rubber cement adhesion layer formed by a rubber cement adhesion treatment performed on the cord.

11. The power transmission belt of claim 9, wherein the rubber composition is a rubber composition that makes an adhesive rubber layer which is included in the belt body and in which the cord is embedded.

12. The power transmission belt of claim 1, wherein the adhesion layer is a rubber cement adhesion layer formed by a rubber cement adhesion treatment performed on the cord.

13. The power transmission belt of claim 12, wherein the rubber composition is a rubber composition that makes an adhesive rubber layer which is included in the belt body and in which the cord is embedded.

14. The power transmission belt of claim 13, wherein the rubber component of the rubber composition that makes the rubber cement adhesion layer is the same as a rubber component of the rubber composition that makes the adhesive rubber layer.

* * * * *

UNITED STATES PATENT AND TRADEMARK OFFICE
CERTIFICATE OF CORRECTION

PATENT NO.         : 10,746,257 B2                                         Page 1 of 1
APPLICATION NO.    : 15/791914
DATED              : August 18, 2020
INVENTOR(S)        : Shogo Kobayashi It is certified that error appears in the above-identified patent and that said Letters Patent is hereby corrected as shown below:

On the Title Page

- In Column 2, item (74), Attorney, Agent, or Firm, Line 1, delete "Knobbe, Marten," and insert -- Knobbe, Martens, --.

In the Specification

- In Column 12, Line 17 (approx.), delete "calender," and insert -- calendar, --.

- In Column 13, Line 55, delete "TEUIN" and insert -- TEIJIN --.

- In Columns 13 and 14, Line 27 (approx.), delete "EDPM" and insert -- EPDM --.

- In Column 15, Line 7 (approx.), delete "(trade" and insert -- trade --.

In the Claims

- In Column 20, Line 17 (approx.), Claim 1, delete "in contact coated" and insert -- coated --.

Signed and Sealed this
Twenty-ninth Day of December, 2020

Andrei Iancu
*Director of the United States Patent and Trademark Office*